United States Patent
Sun et al.

(10) Patent No.: US 11,968,587 B2
(45) Date of Patent: Apr. 23, 2024

(54) MOBILITY MANAGEMENT METHOD, RADIO ACCESS NETWORK, TERMINAL AND COMPUTER STORAGE MEDIUM

(71) Applicant: DATANG MOBILE COMMUNICATIONS EQUIPMENT CO., LTD., Beijing (CN)

(72) Inventors: Jiancheng Sun, Beijing (CN); Haiyang Quan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 398 days.

(21) Appl. No.: 17/282,377

(22) PCT Filed: Sep. 5, 2019

(86) PCT No.: PCT/CN2019/104517
§ 371 (c)(1),
(2) Date: Apr. 1, 2021

(87) PCT Pub. No.: WO2020/073757
PCT Pub. Date: Apr. 16, 2020

(65) Prior Publication Data
US 2021/0345215 A1    Nov. 4, 2021

(30) Foreign Application Priority Data

Oct. 8, 2018   (CN) .......................... 201811169234.3

(51) Int. Cl.
*H04W 36/32*    (2009.01)
*H04W 36/00*    (2009.01)
(Continued)

(52) U.S. Cl.
CPC ....... *H04W 36/32* (2013.01); *H04W 36/0058* (2018.08); *H04W 36/00837* (2018.08); *H04W 36/22* (2013.01); *H04W 84/06* (2013.01)

(58) Field of Classification Search
None
See application file for complete search history.

(56) References Cited

U.S. PATENT DOCUMENTS

| 6,148,176 A | 11/2000 | Kolev et al. |
| 2011/0105126 A1 | 5/2011 | Liang et al. |

(Continued)

FOREIGN PATENT DOCUMENTS

| CN | 103379435 A | 10/2013 |
| CN | 104184515 A | 12/2014 |

(Continued)

OTHER PUBLICATIONS

3GPP TR 23.737 V0.2.0, 3rd Generation Partnership Project;Technical Specification Group Services and System Aspects;Study on architecture aspects for using satellite access in 5G (Release 16), total 18 pages, Aug. 2018.

(Continued)

*Primary Examiner* — Charles N Appiah
*Assistant Examiner* — Frank E Donado
(74) *Attorney, Agent, or Firm* — Kilpatrick Townsend & Stockton LLP

(57) ABSTRACT

Disclosed are a mobility management method, a radio access network, a terminal and a computer storage medium. The method includes: sending, to a terminal, a configuration message, and the terminal reports, according to the configuration message, neighbor cell signal strength or terminal position information; and after a measurement report, which is reported by the terminal and includes the neighbor cell signal strength or the terminal position information, has (Continued)

---

When the terminal is communicated with the non-ground mobile communication network, the terminal reports a measurement report to a current cell of the non-ground mobile communication network according to a configuration message, wherein the measurement report at least includes signal strength of a target cell or terminal position information, and the current cell is a serving cell that provides services to the terminal at present in an NG-RAN of the non-ground mobile communication network — 801

After a handover message of the current cell is received, handover from the current cell to the target cell is carried out according to the handover message, wherein the target cell is a cell determined from specified cells by the NG-RAN — 802 been received, according to the measurement report and position information of an NG-RAN, determining whether a specified condition allowing the terminal to carry out neighbor cell handover is satisfied, and if so, sending a cell handover message to the terminal, and the terminal is handed over from the current cell to a target cell, and the specified condition is a condition allowing the terminal to carry out neighbor cell handover.

15 Claims, 5 Drawing Sheets

(51) Int. Cl.
*H04W 36/22* (2009.01)
*H04W 84/06* (2009.01)

(56) References Cited

U.S. PATENT DOCUMENTS

| | | | |
|---|---|---|---|
| 2016/0323800 A1 | 11/2016 | Ulupinar et al. | |
| 2019/0082334 A1* | 3/2019 | Nagaraja | H04W 72/54 |
| 2020/0033849 A1* | 1/2020 | Yiu | G05D 1/0022 |
| 2020/0178137 A1* | 6/2020 | Hassan Hussein | H04B 7/18541 |
| 2020/0245208 A1* | 7/2020 | Tsuda | H04W 36/08 |
| 2021/0144611 A1* | 5/2021 | Wigard | H04W 36/32 |
| 2021/0360492 A1* | 11/2021 | Han | H04W 36/0058 |

FOREIGN PATENT DOCUMENTS

| | | | |
|---|---|---|---|
| CN | 104185233 A | 12/2014 | |
| CN | 107241135 A | 10/2017 | |
| CN | 109890057 A | 6/2019 | |
| WO | WO-2019028925 A1 * | 2/2019 | H04B 7/18504 |

OTHER PUBLICATIONS

3GPP TR 38.821 V0.1.0, 3rd Generation Partnership Project; Technical Specification Group Radio Access Network; Solutions for NR to support non-terrestrial networks (NTN) (Release 16), total 18 pages, Sep. 2018.

Ericsson, "Mobility aspects for NTN NR", 3GPP TSG-RAN WG2 #103bis, Chengdu, China, Oct. 8-12, 2018, total 5 pages, R2-1814933.

LG Electronics Inc., "Signalling Delay in NTN", 3GPP TSG-RAN WG2 Meeting #103bis, Chengdu, China, Oct. 8-12, 2018, total 2 pages, R2-1815499.

Huawei, "Acquisition of neighbour cell's CSI-RS resource configuration", 3GPP TSG-RAN3 Meeting #99bis, Sanya, China, Apr. 16-20, 2018, total 6 pages, R3-182036.

* cited by examiner

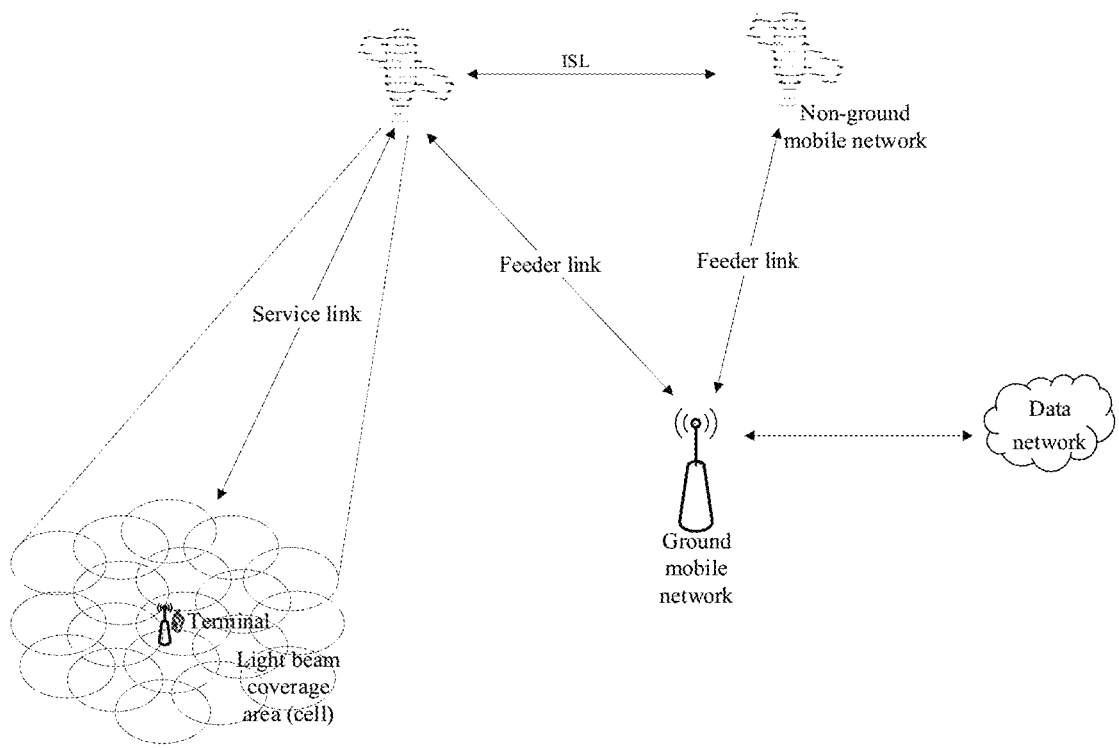

Fig. 1

Send, to a terminal, a configuration message for the terminal to carry out neighbor cell signal measurement or position measurement, such that the terminal reports, according to the configuration message, neighbor cell signal strength or terminal position information, wherein the terminal position information includes GPS position information of the terminal — 201 after a measurement report, which is reported by the terminal and includes the neighbor cell signal strength or the terminal position information, is received, according to the measurement report and position information of the NG-RAN, determine whether a specified condition allowing the terminal to carry out neighbor cell handover is satisfied, and if so, sent a cell handover message to the terminal, such that the terminal is handed over from the current cell to a target cell, wherein the specified condition is a condition allowing the terminal to carry out the neighbor cell handover — 202

Fig. 2

MOBILITY MANAGEMENT METHOD, RADIO ACCESS NETWORK, TERMINAL AND COMPUTER STORAGE MEDIUM

CROSS REFERENCE TO RELATED APPLICATIONS

The application is a National Stage of International Application No. PCT/CN2019/104517, filed on Sep. 5, 2019, which claims the priority to the Chinese Patent Application No. 201811169234.3, filed to the China National Intellectual Property Administration on Oct. 8, 2018, both of which are hereby incorporated by reference in their entirety.

FIELD

The present application relates to the field of communication, in particular to a mobility management method, a radio access network, a terminal and a computer storage medium.

BACKGROUND

A non-ground mobile communication network such as a satellite internet has advantages such as wide coverage range and little influences from natural disasters and physical attack.

The non-ground mobile communication network may be deeply integrated with a ground mobile communication network such as a 5G network to overcome defects in terms of coverage of the ground mobile communication network and further form a three-dimensional and hierarchical integrated network system which is mutually advantage-complementary to and tightly integrated with the ground mobile communication network. In this way, worldwide information transmission and interaction can be realized.

With the satellite internet as an example, the satellite internet is divided into a synchronous satellite, a medium earth orbit satellite and a low earth orbit satellite. If the satellite internet adopts a low earth orbit satellite as an access network, the present application provides several methods for better supporting the mobility of a terminal under the above-mentioned scenario.

A basic assumption of a traditional mobile communication access network is that an RAN (Radio Access Network) is fixed, and the terminal is mobile. All designs from parameters of a physical layer to network identification are based on the above-mentioned assumption.

A very important difference of an access network of the non-ground mobile communication network from an access network of the ground mobile communication network mainly lies in that the RAN is not always static. As shown in FIG. 1, with the non-ground mobile communication network serving as a satellite as an example, beams of the satellite may rapidly sweep the ground under the condition that the satellite moves at high speed. If the satellite carries a base station, these cell beams sweeping the ground correspond to actual physical cells, which means that the physical cells can rapidly move on the ground surface. Even if the terminal does not move, it is possible that the terminal is rapidly handed over among the cell beams of the satellite. Furthermore, the terminal frequently hands over the cell beams, which will increase the problems of signaling load and handover delay of the RAN, reducing the service continuity and quality of service for the terminal.

The RAN of a traditional ground mobile communication network is fixed, a handover design aiming at the mobility of the terminal is only considered when a terminal handover process is designed, and therefore, the above-mentioned problems may not be solved by using a terminal handover method in which the ground mobile communication network is adopted.

For this reason, how to reduce the signaling load and handover delay of the RAN of the non-ground mobile communication network becomes a problem to be solved urgently.

SUMMARY

The present application provides a mobility management method, a radio access network, a terminal and a computer storage medium, which are used for solving the problem that the signaling load and handover delay of a radio access network are relatively high in the condition that cell handover is carried out in a non-ground mobile communication network.

In one embodiment, for solving the above-mentioned problem, an embodiment of the present application provides a mobility management method applied to a non-ground mobile communication network. In some embodiments, sending, to a terminal, a configuration message for the terminal to carry out neighbor cell signal measurement or position measurement, and the terminal reports, according to the configuration message, neighbor cell signal strength or terminal position information, and the terminal position information includes GPS (Global Positioning System) position information of the terminal;

determining, according to position information of the NG-RAN and a measurement report, whether a specified condition allowing the terminal to carry out a neighbor cell handover is satisfied, after a measurement report, which is reported by the terminal and includes the neighbor cell signal strength or the terminal position information, is received, and sending a cell handover message to the terminal to handover the terminal from a current cell to a target cell, if the specified condition allowing the terminal to carry out neighbor cell handover is satisfied, and the specified condition is a condition allowing the terminal to carry out the neighbor cell handover.

The configuration message for the terminal to carry out neighbor cell signal measurement or position measurement is sent to the terminal through the non-ground mobile communication network, and the terminal reports, according to the configuration message, the neighbor cell signal strength or terminal position information; and after the measurement report, which is reported by the terminal and includes the neighbor cell signal strength or the terminal position information, is received, according to the measurement report and position information of the NG-RAN, it is determined whether the specified condition allowing the terminal to carry out neighbor cell handover is satisfied, and if so, the cell handover message is sent to the terminal, and the terminal is handed over from the current cell to the target cell, and the terminal position information includes the GPS position information of the terminal, and the specified condition is the condition allowing the terminal to carry out neighbor cell handover. Therefore, the signaling load and the handover delay of the NG-RAN are reduced when cell handover is carried out in the non-ground mobile communication network.

In one embodiment, when the configuration message for the terminal to carry out neighbor cell signal measurement is sent to the terminal, the configuration message includes: information of a first neighbor cell beam adjacent to a beam serving the terminal at present, and the terminal carries out cell handover in the NG-RAN of the non-ground mobile communication network, and the first neighbor cell beam is a beam corresponding to the target cell in the NG-RAN; or information of a second neighbor cell beam of a neighbor NG-RAN, of the non-ground mobile communication network, adjacent to the NG-RAN of the non-ground mobile communication network, and the terminal carries out cell handover among different NG-RANs of the non-ground mobile communication network, and the second neighbor cell beam is a beam corresponding to the target cell; or information of a third neighbor cell of a ground mobile network, and the terminal carries out cell handover between the non-ground mobile communication network and the ground mobile network, and a beam of the third neighbor cell is a beam corresponding to the target cell, and the ground mobile network is adjacent to the NG-RAN of the non-ground mobile communication network.

In one embodiment, when the configuration message for the terminal to carry out the terminal position information measurement is sent to the terminal, the configuration message includes: the terminal position information, or terminal moving information and the terminal position information, and the terminal moving information includes moving speed, a moving direction and a type of the terminal; and a reporting occasion of the configuration message, and the reporting occasion is a moment when a moving state of the terminal is rapidly changed or a reporting period.

In one embodiment, the specified condition means that: a difference of signal strength of the target cell and signal strength of the current cell in the measurement report is greater than a first threshold, and the first threshold is a critical value at which the terminal is required to carry out cell handover; and/or a cell load of the target cell is smaller than a second threshold, and the second threshold is a critical value at which the target cell allows entry of the terminal from the current cell.

In one embodiment, the sending the cell handover message to the terminal, if the measurement report satisfies the specified condition, includes: predicting, according to the terminal position information in the measurement report and moving speed and positioning information of the NG-RAN, or according to the terminal position information and the terminal moving information as well as the moving speed and positioning information of the NG-RAN, a time range in which the terminal reaches an area co-covered by the current cell and the target cell; and sending the cell handover message to the terminal in the condition that a specified moment within the time range is reached.

In one embodiment, predicting, according to the terminal position information in the measurement report and moving speed and positioning information of the NG-RAN, or according to the terminal position information and the terminal moving information as well as the moving speed and positioning information of the NG-RAN, the time range in which the terminal reaches the area co-covered by the current cell and the target cell, includes: within a specified time range, predicting, according to the moving speed and positioning information of the NG-RAN, a moving track, of a cell corresponding to each beam in the NG-RAN, on the ground; within the specified time range, determining the current position of the terminal and predicting a moving track of the terminal according to the terminal position information or the terminal position information and the terminal moving information; and determining, according to the moving track, of the cell corresponding to each beam in the NG-RAN, on the ground and the moving track of the terminal, the time range in which the terminal reaches the area co-covered by the current cell and the target cell.

In one embodiment, the sending a cell handover message to the terminal, if the measurement report satisfies the specified condition, includes: determining, according to the terminal position information in the measurement report, whether the terminal enters into a ground mobile communication network, if so, acquiring information of a fourth cell closest to the terminal position information, and determining the fourth cell as the target cell, and the fourth cell is a cell of the ground mobile network; sending, to the terminal, configuration information for the terminal to carry out signal measurement on the fourth cell, and the terminal measures the signal strength of the fourth cell based on the configuration information; receiving the measurement report that is returned by the terminal and about the signal strength of the fourth cell; and sending the cell handover message to the terminal, if the signal strength of the fourth cell in the measurement report reaches a preset value.

In one embodiment of the present application provides a mobility management method applied to a ground mobile communication network. Embodiments are described as follows: acquiring cell configuration information of a non-ground mobile communication network by OAM (Operation Administration and Maintenance); and broadcasting the cell configuration information to a cell of the ground mobile communication network.

In one embodiment, the cell configuration information is beam information of the non-ground mobile communication network.

In one embodiment of the present application provides a mobility management method applied to a terminal. Embodiments are described as follows: reporting, by the terminal, a measurement report to a current cell of the non-ground mobile communication network according to a configuration message, in the condition that the terminal is communicated with the non-ground mobile communication network, and the measurement report at least includes signal strength of a target cell or terminal position information, and the current cell is a serving cell that provides services to the terminal at present in an NG-RAN (Next Generation-Radio Access Network) of the non-ground mobile communication network; and carrying out handover from the current cell to the target cell according to a handover message, after the handover message of the current cell is received.

In one embodiment, the reporting the measurement report to the current cell of the non-ground mobile communication network according to the configuration message includes: reporting, to the current cell, the measurement report carrying signal strengths of the specified cells when the signal strength of any one cell in the specified cells reaches a set threshold, if the signal strengths of specified cells are required to be returned in the configuration message.

In one embodiment, the reporting the measurement report to the current cell of the non-ground mobile communication network according to the configuration message includes: reporting, by the terminal, the measurement report carrying the terminal position information to the current cell regularly or in the condition that a preset condition is satisfied, if the terminal position information is required to be returned in the configuration message.

In one embodiment of the present application provides an NG-RAN used for mobility management and applied to a non-ground mobile communication network. The NG-RAN includes: a sending device, configured to send, to a terminal, a configuration message for the terminal to carry out neighbor cell signal measurement or position measurement, and the terminal reports, according to the configuration message, the neighbor cell signal strength or terminal position information, and the terminal position information includes GPS position information of the terminal; and a receiving device, configured to determine, according to position information of the NG-RAN and a measurement report, whether a specified condition allowing the terminal to carry out neighbor cell handover is satisfied, after the measurement report, which is reported by the terminal and includes the neighbor cell signal strength or the terminal position information, is received, and send a cell handover message to the terminal to handover the terminal from a current cell to a target cell, if the specified condition allowing the terminal to carry out the neighbor cell handover is satisfied, and the specified condition is a condition allowing the terminal to carry out the neighbor cell handover.

In one embodiment, when the configuration message for the terminal to carry out neighbor cell signal measurement is sent to the terminal, the configuration message includes: information of a first neighbor cell beam adjacent to a beam serving the terminal at present, and the terminal carries out cell handover in the NG-RAN of the non-ground mobile communication network, and the first neighbor cell beam is a beam corresponding to the target cell in the NG-RAN; or information of a second neighbor cell beam of a neighbor NG-RAN, of the non-ground mobile communication network, adjacent to the NG-RAN of the non-ground mobile communication network, and the terminal carries out cell handover among different NG-RANs of the non-ground mobile communication network, and the second neighbor cell beam is a beam corresponding to the target cell; or information of a third neighbor cell of a ground mobile network, and the terminal carries out cell handover between the non-ground mobile communication network and the ground mobile network, and a beam of the third neighbor cell is a beam corresponding to the target cell, and the ground mobile network is adjacent to the NG-RAN of the non-ground mobile communication network.

In one embodiment, when the configuration message for the terminal to carry out the terminal position information measurement is sent to the terminal, the configuration message includes: the terminal position information, or terminal moving information and the terminal position information, and the terminal moving information includes moving speed, a moving direction and a type of the terminal; and a reporting occasion of the configuration message, and the reporting occasion is a moment when a moving state of the terminal is rapidly changed or a reporting period.

In one embodiment, the specified condition means that: a difference between signal strength of the target cell and signal strength of the current cell in the measurement report is greater than a first threshold, and the first threshold is a critical value at which the terminal is required to carry out cell handover; and/or a cell load of the target cell is smaller than a second threshold, and the second threshold is a critical value at which the target cell allows entry of the terminal from the current cell.

In one embodiment, the receiving device is configured to: predict, according to the terminal position information in the measurement report and moving speed and positioning information of the NG-RAN, or according to the terminal position information and the terminal moving information as well as the moving speed and positioning information of the NG-RAN, a time range in which the terminal reaches an area co-covered by the current cell and the target cell; and send the cell handover message to the terminal in the condition that a specified moment within the time range is reached.

In one embodiment, the receiving device is configured to: within a specified time range, predict, according to the moving speed and positioning information of the NG-RAN, a moving track, of a cell corresponding to each beam in the NG-RAN, on the ground; within the specified time range, determine the current position of the terminal and predict a moving track of the terminal according to the terminal position information or the terminal position information and the terminal moving information; and determine, according to the moving track, of the cell corresponding to each beam in the NG-RAN, on the ground and the moving track of the terminal, the time range in which the terminal reaches the area co-covered by the current cell and the target cell.

In one embodiment, the receiving device is further configured to: determine, according to the terminal position information in the measurement report, whether the terminal enters into a ground mobile communication network, if so, acquire information of a fourth cell closest to the terminal position information, and determine the fourth cell as the target cell, and the fourth cell is a cell of the ground mobile network; send, to the terminal, configuration information for the terminal to carry out signal measurement on the fourth cell, and the terminal measures signal strength of the fourth cell based on the configuration information; receive the measurement report that is returned by the terminal and about the signal strength of the fourth cell; and send the cell handover message to the terminal, if the signal strength of the fourth cell in the measurement report reaches a preset value.

In one embodiment of the present application provides an RAN used for mobility management and applied to a ground mobile communication network. The RAN includes: an acquiring device, configured to acquire cell configuration information of a non-ground mobile communication network by OAM; and a broadcasting device, configured to broadcast the cell configuration information to a cell of the ground mobile communication network.

In one embodiment, the cell configuration information is beam information of the non-ground mobile communication network.

In one embodiment of the present application provides a terminal used for mobility management. The terminal includes: a sending device, configured to report a measurement report to a current cell of a non-ground mobile communication network according to a configuration message, in the condition that the terminal is communicated with the non-ground mobile communication network, and the measurement report at least includes the signal strength of a target cell or terminal position information, and the current cell is a serving cell that provides services to the terminal at present in an NG-RAN of the non-ground mobile communication network; and a receiving device, configured to carry out handover from the current cell to the target cell according to a handover message, after the handover message of the current cell is received.

In one embodiment, the sending device is configured to report, to the current cell, the measurement report carrying signal strengths of the specified cells when the signal strength of any one cell in the specified cells reaches a set threshold, if the signal strengths of specified cells are required to be returned in the configuration message.

In one embodiment, the sending device is further configured to report the measurement report carrying the terminal position information to the current cell regularly or when a preset condition is satisfied, if the terminal position information is required to be returned in the configuration message.

In one embodiment of the present application provides an NG-RAN of a non-ground mobile communication network. The NG-RAN includes a processor, a memory and a transceiver, and the processor is configured to read a program in the memory to: send, to a terminal, a configuration message for the terminal to carry out neighbor cell signal measurement or position measurement, and the terminal reports, according to the configuration message, neighbor cell signal strength or terminal position information, and the terminal position information includes GPS position information of the terminal; and determine, according to position information of the NG-RAN and a measurement report, whether a specified condition allowing the terminal to carry out neighbor cell handover is satisfied, after the measurement report, which is reported by the terminal and includes the neighbor cell signal strength or the terminal position information, is received, and send a cell handover message to the terminal to handover the terminal from a current cell to a target cell, if the specified condition allowing the terminal to carry out the neighbor cell handover is satisfied, and the specified condition is a condition allowing the terminal to carry out the neighbor cell handover.

In one embodiment, when the configuration message for the terminal to carry out neighbor cell signal measurement is sent to the terminal, the configuration message includes: information of a first neighbor cell beam adjacent to a beam serving the terminal at present, and the terminal carries out cell handover in the NG-RAN of the non-ground mobile communication network, and the first neighbor cell beam is a beam corresponding to the target cell in the NG-RAN; or information of a second neighbor cell beam of a neighbor NG-RAN, of the non-ground mobile communication network, adjacent to the NG-RAN of the non-ground mobile communication network, and the terminal carries out cell handover among different NG-RANs of the non-ground mobile communication network, and the second neighbor cell beam is a beam corresponding to the target cell; or information of a third neighbor cell of a ground mobile network adjacent to the NG-RAN, and the terminal carries out cell handover between the non-ground mobile communication network and the ground mobile network, and a beam of the third neighbor cell is a beam corresponding to the target cell, and the ground mobile network is adjacent to the NG-RAN of the non-ground mobile communication network.

In one embodiment, when the configuration message for the terminal to carry out the terminal position information measurement is sent to the terminal, the configuration message includes: the terminal position information, or terminal moving information and the terminal position information, and the terminal moving information includes moving speed, a moving direction and a type of the terminal; and a reporting occasion of the configuration message, and the reporting occasion is a moment in the condition that a moving state of the terminal is rapidly changed or a reporting period.

In one embodiment, the specified condition means that: a difference of signal strength of the target cell and signal strength of the current cell in the measurement report is greater than a first threshold, and the first threshold is a critical value at which the terminal is required to carry out cell handover; and/or a cell load of the target cell is smaller than a second threshold, and the second threshold is a critical value at which the target cell allows entry of the terminal from the current cell.

In one embodiment, the processor is configured to: predict, according to the terminal position information in the measurement report and moving speed and positioning information of the NG-RAN, or according to the terminal position information and the terminal moving information as well as the moving speed and positioning information of the NG-RAN, a time range in which the terminal reaches an area co-covered by the current cell and the target cell; and send the cell handover message to the terminal in the condition that a specified moment within the time range is reached.

In one embodiment, the processor is configured to: within a specified time range, predict, according to the moving speed and positioning information of the NG-RAN, a moving track, of a cell corresponding to each beam in the NG-RAN, on the ground; within the specified time range, determine the current position of the terminal and predict a moving track of the terminal according to the terminal position information or the terminal position information and the terminal moving information; and determine, according to the moving track, of the cell corresponding to each beam in the NG-RAN, on the ground and the moving track of the terminal, the time range in which the terminal reaches the area co-covered by the current cell and the target cell.

In one embodiment, the processor is further configured to: determine, according to the terminal position information in the measurement report, whether the terminal enters into a ground mobile communication network, if so, acquire information of a fourth cell closest to the terminal position information, and determine the fourth cell as the target cell, and the fourth cell is a cell of the ground mobile network; send, to the terminal, configuration information for the terminal to carry out signal measurement on the fourth cell, and the terminal measures signal strength of the fourth cell based on the configuration information; receive the measurement report that is returned by the terminal and about the signal strength of the fourth cell; and send the cell handover message to the terminal, if the signal strength of the fourth cell in the measurement report reaches a preset value.

In one embodiment of the present application provides an RAN of a ground mobile communication network. The RAN includes a processor, a memory and a transceiver, and the processor is configured to read a program in the memory to: acquire cell configuration information of a non-ground mobile communication network by OAM; and broadcast the cell configuration information to a cell of the ground mobile communication network.

In one embodiment, the cell configuration information is beam information of the non-ground mobile communication network.

In one embodiment of the present application provides a terminal. The terminal includes a processor, a memory and a transceiver, and the processor is configured to read a program in the memory to: report a measurement report to a current cell of the non-ground mobile communication network according to a configuration message, in the condition that the terminal is communicated with the non-ground mobile communication network, and the measurement report at least includes the signal strength of a target cell or terminal position information, and the current cell is a serving cell that provides services to the terminal at present in an NG-RAN of the non-ground mobile communication network; and carry out handover from the current cell to the target cell according to a handover message, after the handover message of the current cell is received.

In one embodiment, the processor is configured to: report, to the current cell, the measurement report carrying the signal strengths of the specified cells when the signal strength of any one cell in the specified cells reaches a set threshold, if the signal strengths of specified cells are required to be returned in the configuration message.

In one embodiment, the processor is further configured to: report the measurement report carrying the terminal position information to the current cell regularly or in the condition that a preset condition is satisfied, if the terminal position information is required to be returned in the configuration message.

In one embodiment of the present application provides a computer readable storage medium. The computer readable storage medium stores a computer instruction. When the computer instruction runs on a computer, the computer is enabled to execute the method according to the above-mentioned the embodiments.

According to one or more of the above-mentioned embodiments in the present application, the embodiments of the present application at least have the following: in the embodiments provided by the present application, the configuration message for the terminal to carry out neighbor cell signal measurement or position measurement is sent to the terminal through the non-ground mobile communication network, and the terminal reports, according to the configuration message, the neighbor cell signal strength or terminal position information; and after the measurement report, which is reported by the terminal and includes the neighbor cell signal strength or the terminal position information, is received, according to the measurement report and position information of the NG-RAN, it is determined whether the specified condition allowing the terminal to carry out neighbor cell handover is satisfied, and if so, the cell handover message is sent to the terminal, and the terminal is handed over from the current cell to the target cell, and the terminal position information includes the GPS position information of the terminal, and the specified condition is the condition allowing the terminal to carry out neighbor cell handover. Therefore, the signaling load and the handover delay of the NG-RAN are reduced when cell handover is carried out in the non-ground mobile communication network.

BRIEF DESCRIPTION OF THE DRAWINGS

FIG. 1 is a schematic diagram showing a cell formed by a beam emitted by a satellite on the ground.

FIG. 2 is a flow diagram showing a mobility management method for a non-ground mobile communication network side according to an embodiment of the present application.

DETAILED DESCRIPTION OF THE EMBODIMENTS

Figure 3:
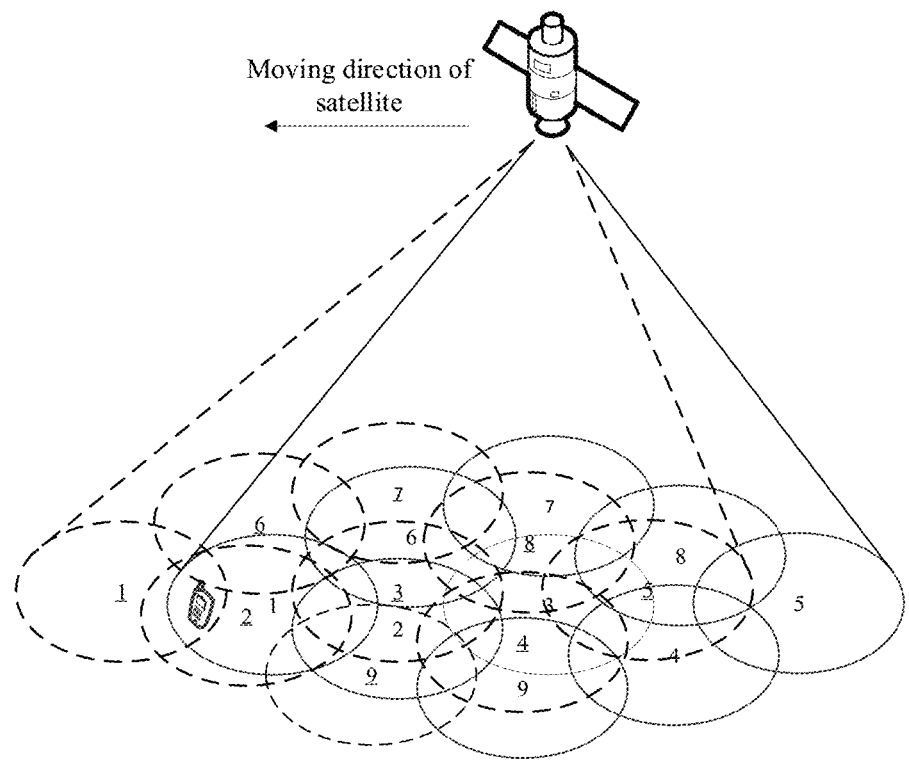
FIG. 3 is a schematic diagram showing that cells governed by an NG-RAN on a low earth orbit satellite move with the low earth orbit satellite according to an embodiment of the present application.

Embodiments of the present application provide a mobility management method, a radio access network, a terminal and a computer storage medium, which are used for solving the problem that the signaling load and handover delay of a radio access network are relatively high when cell handover is carried out in a non-ground mobile communication network.

For solving the above-mentioned problem, in the embodiments of the present application provide a mobility management method applied to a non-ground mobile communication network. The method includes: a configuration message for the terminal to carry out neighbor cell signal measurement or position measurement is sent to a terminal, and the terminal reports, according to the configuration message, the neighbor cell signal strength or terminal position information, and the terminal position information includes GPS position information of the terminal; and after a measurement report, which is reported by the terminal and includes the neighbor cell signal strength or the terminal position information, is received, according to the measurement report and position information of the NG-RAN, it is determined whether a specified condition allowing the terminal to carry out neighbor cell handover is satisfied, and if the specified condition allowing the terminal to carry out the neighbor cell handover is satisfied, a cell handover message is sent to the terminal, and the terminal is handed over from a current cell to a target cell, and the specified condition is a condition allowing the terminal to carry out the neighbor cell handover.

In the above-mentioned solutions, the configuration message for the terminal to carry out neighbor cell signal measurement or position measurement is sent to the terminal through the non-ground mobile communication network, and the terminal reports, according to the configuration message, the neighbor cell signal strength or terminal position information; and after the measurement report, which is reported by the terminal and includes the neighbor cell signal strength or the terminal position information, is received, according to the measurement report and position information of the NG-RAN, it is determined whether the specified condition allowing the terminal to carry out the neighbor cell handover is satisfied, and if so, the cell handover message is sent to the terminal, and the terminal is handed over from the current cell to the target cell, and the terminal position information includes the GPS position information of the terminal, and the specified condition is the condition allowing the terminal to carry out the neighbor cell handover. Therefore, the signaling load and the handover delay of the NG-RAN are reduced when cell handover is carried out in the non-ground mobile communication network.

In order to better understand the above-mentioned embodiments of the present application they will be described in detail below in conjunction with the accompanying drawings and specific embodiments. It should be understood that the embodiments of the present application and specific features in the embodiments are intended to describe the embodiments of the present application in detail, rather than to limit the embodiments of the present application, and the embodiments in the present application may be combined with each other without conflicts.

Referring to FIG. 2, an embodiment of the present application provides a mobility management method applied to a non-ground mobile communication network. Processes the method are described as follows.

Step 201: a configuration message for the terminal to carry out neighbor cell signal measurement or position measurement is sent to a terminal, and the terminal reports, according to the configuration message, neighbor cell signal strength or terminal position information, and the terminal position information includes GPS position information of the terminal.

Step 202: after a measurement report, which is reported by the terminal and includes the neighbor cell signal strength or the terminal position information, is received, according to the measurement report and position information of the NG-RAN, it is determined whether a specified condition allowing the terminal to carry out neighbor cell handover is satisfied, and if so, a cell handover message is sent to the terminal, and the terminal is handed over from the current cell to a target cell, and the specified condition is a condition allowing the terminal to carry out the neighbor cell handover.

The NG-RAN of the non-ground mobile communication network may be a base station which may be mounted on a carrier, such as a satellite and an unmanned aerial vehicle, that can move freely, so that the radio access network is capable of moving with the carrier, and a cell corresponding to each beam emitted from the carrier to the ground also moves with the carrier. The satellite may be divided into several types as shown in Table 1.

TABLE 1

| Platform | Altitude range | Orbit | Typical light beam range |
| --- | --- | --- | --- |
| Low earth orbit satellite | 300-1500 km | Circle surrounding the earth | 100-500 km |
| Medium earth orbit satellite | 7000-25000 km | | 100-500 km |
| Synchronous satellite | 35786 km | Nominal station holding position | 200-1000 km |
| UAS (Unmanned Aerial System) platform (including HAPS (High Altitude Platform Station)) | 8-50 km (20 km for HAPS) | fixed relative to a given earth point in terms of elevation/ azimuth | 5-200 km |

TABLE 1-continued

| Platform | Altitude range | Orbit | Typical light beam range |
| --- | --- | --- | --- |
| High earth orbit satellite | 400-50000 km | Ellipse surrounding the earth | 200-1000 km |

It should be noted that the non-ground mobile communication network does not include the synchronous satellite in the embodiments provided by the present application.

The non-ground mobile communication network is described with the low earth orbit satellite as an example. Referring to FIG. 3, along with the movement of the low earth orbit satellite, cells (that is, beams) governed by the NG-RAN on the low earth orbit satellite move with the low earth orbit satellite, and the cells 1-9 move from right to left with the low earth orbit satellite, and the current position, of the NG-RAN on the low earth orbit satellite, on the ground is shown as a continuous line in FIG. 3. After the low earth orbit satellite moves, the position, of the NG-RAN on the low earth orbit satellite, on the ground is shown as a dotted line in FIG. 3.

It should be understood that the beams projected from the satellite to the ground have the characteristics that signals are relatively uniform, and there is a small difference of signal strength in the center and at the edge of each beam. Therefore, the measurement report and handover decision based on signal quality in a system similar to a current ground mobile communication system may not take effect in the non-ground mobile communication network such as a satellite internet system. Therefore, a handover method used in a traditional mobile communication network may be insufficient to support the mobility of UE in the non-ground mobile communication network.

In order to support the mobility of the UE in the non-ground mobile communication network, an NG-RAN at a network side may send a configuration message to the terminal for the terminal to carry out neighbor cell signal measurement of the UE or terminal position information measurement, and the network side may determine, according to a measurement report, which is reported by the UE and includes neighbor cell signal strength or terminal position information, whether the terminal is allowed to carry out cell handover.

According to different measurement contents required to be reported in the configuration message sent by the network side, the configuration message requiring the terminal to carry out neighbor cell signal measurement and terminal position information measurement is respectively described in the embodiments as follows.

In one embodiment, when the network side of the non-ground mobile communication network sends, to the terminal, a configuration message for the terminal to carry out neighbor cell signal measurement, a handover scenario may be divided into the following three situations according to a position of a target cell to which the UE will be handed over, and accordingly, a configuration message sent to the terminal by the NG-RAN and used for the terminal to carry out neighbor cell signal measurement is also divided into three situations.

First situation: the target cell to which the UE will be handed over and the current cell where the UE is located at present are both located in the same NG-RAN of the non-ground mobile communication network.

The configuration message sent to the terminal by the NG-RAN is information of a first neighbor cell beam adjacent to a beam serving the terminal at present, and the terminal can carry out cell handover in the NG-RAN of the non-ground mobile communication network, and the first neighbor cell beam is a beam corresponding to the target cell in the NG-RAN.

Second situation: the target cell to which the UE will be handed over and the current cell where the UE is located at present are located in different NG-RANs of the non-ground mobile communication network.

The configuration message sent to the terminal by the NG-RAN is information of a second neighbor cell beam of a neighbor NG-RAN, of the non-ground mobile communication network, adjacent to the NG-RAN of the non-ground mobile communication network, and the terminal can carry out cell handover among the different NG-RANs of the non-ground mobile communication network, and the second neighbor cell beam is a beam corresponding to the target cell.

Third situation: the target cell to which the UE will be handed over is a cell in an RAN of a ground mobile communication network.

The configuration message sent to the terminal by the NG-RAN is information of a third neighbor cell of the ground mobile network adjacent to the NG-RAN, and the terminal carries out cell handover between the non-ground mobile communication network and the ground mobile network.

It should be noted that, in the above-mentioned three situations, the current cell where the UE is located at present is a cell of the non-ground mobile communication network.

After the terminal returns, according to the configuration messages sent under the above-mentioned three scenarios by the NG-RAN at the network side, neighbor cell signal strength obtained after neighbor cell signal measurement, the NG-RAN determines whether the neighbor cell signal strength in the received measurement report satisfies a specified condition, and if so, a cell handover message is sent to the terminal, and the terminal is handed over from the current cell to a target cell.

In one embodiment, the specified condition may mean that: a difference between signal strength of the target cell and signal strength of the current cell in the measurement report is greater than a first threshold, and the first threshold is a critical value at which the terminal is required to carry out cell handover; and/or a cell load of the target cell is smaller than a second threshold, and the second threshold is a critical value at which the target cell allows entry of the terminal from the current cell.

For example, when the specified condition is that the difference between the signal strength of the target cell and the signal strength of the current cell in the measurement report is greater than the first threshold, it is assumed that the signal strength of the current cell is X, the signal strength of the target cell is Y, and M is the first threshold, and X<Y−M. It may be determined that Y−X>M. Furthermore, it is determined that the neighbor cell signal strength satisfies the specified condition allowing the terminal to carry out handover. In this way, the NG-RAN may send the cell handover message to the terminal, and the terminal is handed over from the current cell to the target cell.

When the specified condition is that the difference between the signal strength of the target cell and the signal strength of the current cell in the measurement report is greater than the first threshold and the cell load of the target cell is smaller than the second threshold, if the second threshold is N, after it is determined that the neighbor cell signal strength satisfies the specified condition allowing the terminal to carry out handover, it is required to be further determined whether the cell load of the target cell is smaller than the second threshold N. If so, the NG-RAN may send the cell handover message to the terminal, and the terminal is handed over from the current cell to the target cell.

Figure 4:
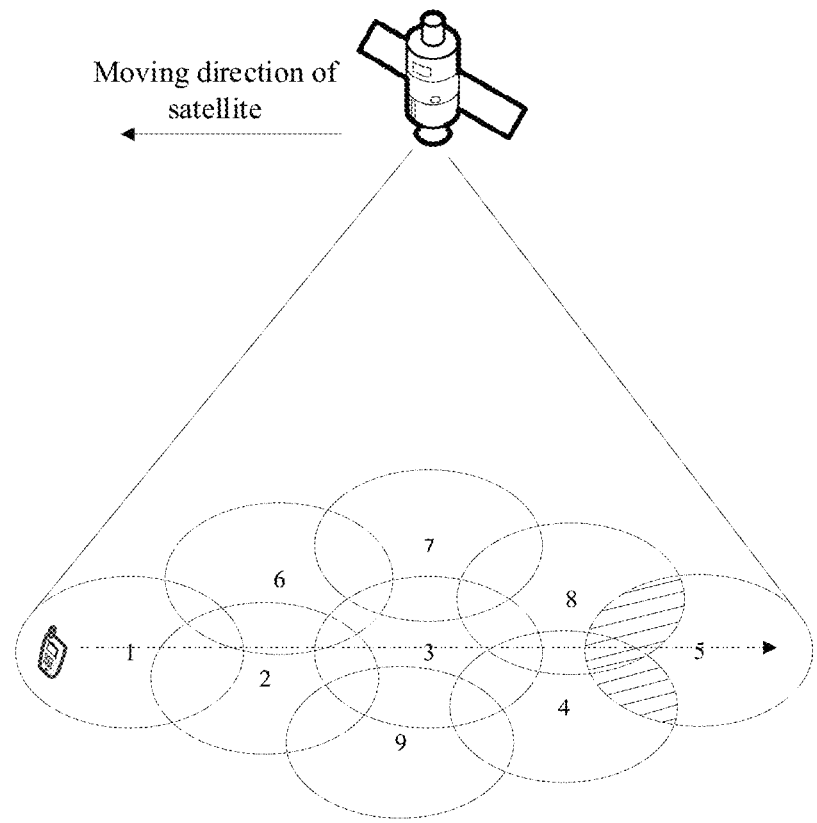
FIG. 4 is a schematic diagram showing that a terminal provided by an embodiment of the present application is handed over among cells in the same satellite.

For example, referring to FIG. 4, a schematic diagram showing that the terminal is handed over among cells in the same satellite is shown.

Cells governed by the satellite A are cells 1-9, and the UE works in cell 1 at present. With the movement of the satellite, cells 1, 2, 3, 4 and 5 governed by the satellite will sweep the UE in order, which is equivalent to that the UE moves from the cell 1 to the cell 5, as shown by a dotted arrow in FIG. 5.

The cell 1 governed by the satellite sends a configuration message for the terminal to carry out the neighbor cell measurement to the UE. The configuration message at least includes a measurement report used for the terminal to measure beam information corresponding to the neighbor cells 2 and 6, and returned by the UE after a first condition is satisfied, and the first condition may be that signal strength values of the cell 2 and the cell 6 are measured to satisfy the first threshold.

After the UE moves to an area co-covered by the cell 1 and the cell 2, and the signal strength value of the cell 2 is measured to satisfy the first threshold, the UE reports the measurement report.

After a base station in the satellite A receives the measurement report, it is determined whether the UE carries out cell handover according to measurement results, from the UE, for the cell 1 and the cell 2 (or measurement results for more neighbor cells are returned together). If the signal strength value of the cell 2 is higher and the cell load of the cell 2 is smaller than the second threshold, the cell 2 is used as the target cell, and the base station in the satellite A hands over the UE to the cell 2. Related resources are prepared, and a handover message for handing over the UE to the cell 2 is sent to the UE.

After receiving the handover message, the UE initiates synchronization and access to the cell 2 according to configuration information in the handover message.

After the UE is handed over to the cell 2, the base station in the satellite A configures new neighbor cells such as the neighbor cells 1, 3, 6 and 9 to the UE. A process that the UE is subsequently handed over from the cell 2 to the cell 5 is similar to the above-mentioned process of handover from the cell 1 to the cell 2, and the descriptions thereof are omitted herein.

Figure 5:
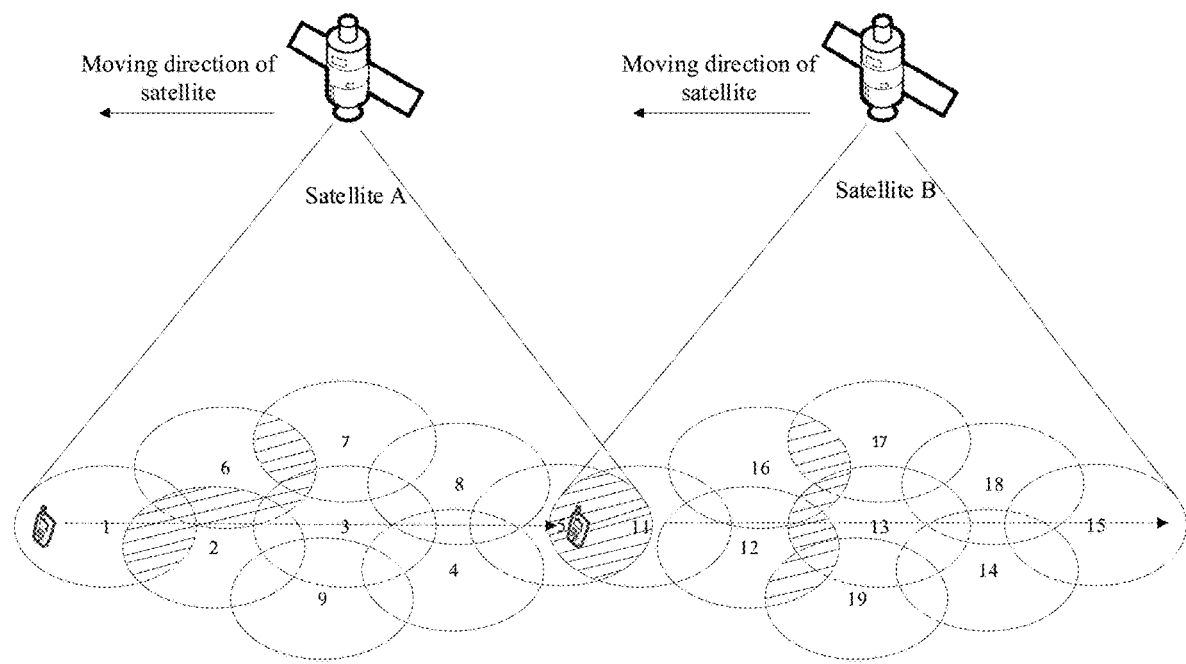
FIG. 5 is a schematic diagram showing that a terminal provided by an embodiment of the present application is handed over among cells in different satellites.

For another example, referring to FIG. 5, a schematic diagram showing that a terminal is handed over among the cells in different satellites is shown.

The cells governed by the satellite A are cells 1-9, the UE works in the cell 5 at present, and the cells 1, 2, 3, 4 and 5 governed by the satellite A will sweep the UE in order. The satellite B is adjacent to the satellite A, has the same moving track with the satellite A and moves behind the satellite A. Cells governed by the satellite B are cells 11-19. Cells 11-15 governed by the satellite B will sweep the UE in order, and the cell 5 and the cell 11 are adjacent to each other.

The cell 5 governed by the satellite A sends a configuration message for the terminal to carry out neighbor cell signal measurement to the UE, and the signal strength of a neighbor cell which is the cell 11 governed by the satellite B is required to be measured in the configuration message.

After the UE moves to an area co-covered by the cell 11 and the cell 15, and a signal strength value of the cell 11 is measured to satisfy the specified condition in the configuration message, the UE reports the measurement report.

After a base station (corresponding to the cell 5) in the satellite A receives the measurement report, it is determined whether a difference between the signal strength of the cell 11 and the signal strength of the cell 5 is greater than the first threshold according to measurement results, from the UE, for the cells 5 and 11 (measurement results for more neighbor cells may also be included), and if so, it is further determined whether a cell load of the cell 11 is smaller than the second threshold value. If so, it is regarded that the UE satisfies the condition that the UE is handed over to the cell 11. The base station the satellite A hands over the UE from the cell 5 to the cell 11 governed by the satellite B.

After the base station in the satellite A determines that a specified condition allowing the UE to carry out cell handover is satisfied, the satellite A and the satellite B carry out handover preparation, if there is a direct interface (similar to an Xn/X2 interface) between the satellite A and the satellite B, a handover preparation process (similar to Xn/X2 handover) will be carried out through the direct interface; otherwise, handover preparation (similar to NG/Xn handover) is completed by virtue of a core network. A specific handover preparation process of the satellite A and the satellite B is not described in detail, which can take a handover process of Xn/X2 or NG/Xn in the prior art as reference. Then, the base station in the satellite A sends a handover message to the UE, and the UE initiates synchronization and access to the cell 11 according to the configuration of the handover message.

In one embodiment, when the network side of the non-ground mobile communication network sends, to the terminal, a configuration message for the terminal to carry out terminal position information measurement, the configuration message includes: the terminal position information, or terminal moving information and the terminal position information, and the moving information includes moving speed, a moving direction and a type of the terminal; and a reporting occasion of the configuration message, and the reporting occasion is a moment when a moving state of the terminal is rapidly changed or a reporting period.

For example, the reporting occasion may be a reporting period for reporting the terminal position information, or an event reporting when the moving state of the terminal is rapidly changed, for example, a high-speed rail starts/stops, and an airplane takes off/lands.

After the terminal position information required and/or the terminal moving information in the configuration message are measured by the terminal according to the above-mentioned configuration message, accordingly, a measurement report including the terminal position information will be returned to the NG-RAN at the network side.

After the NG-RAN at the network side receives the measurement report including the terminal position information, it is determined whether the measurement report including the terminal position information satisfies the specified condition, if so, the cell handover message is sent to the terminal, and according to whether the target cell belongs to the non-ground mobile communication network or the ground mobile communication network, a processing way is further divided into two modes as follows.

First mode: when the target cell belongs to the non-ground mobile communication network, it is determined whether the measurement report, including the terminal position information, satisfies the specified condition, if so, a process that the cell handover message is sent to the terminal is described as follows.

Firstly, a time range in which the terminal reaches an area co-covered by the current cell and the target cell is predicted according to the terminal position information in the measurement report and moving speed and positioning information of the NG-RAN, or according to the terminal position information and the terminal moving information as well as the moving speed and positioning information of the NG-RAN.

In one embodiment, it is possible that, within a specified time range, a moving track, of a cell corresponding to each beam in the NG-RAN, on the ground is firstly predicted according to the moving speed and positioning information of the NG-RAN; then, within the specified time range, the current position of the terminal is determined and a moving track of the terminal is predicted according to the terminal position information or the terminal position information and the terminal moving information; and then, the time range in which the terminal reaches the area co-covered by the current cell and the target cell is determined according to the moving track, of the cell corresponding to each beam in the NG-RAN, on the ground and the moving track of the terminal.

Finally, when a specified moment within the time range is reached, the cell handover message is sent to the terminal.

Second mode: when the target cell belongs to the ground mobile communication network, it is determined whether the measurement report, including the terminal position information, satisfies the specified condition, if so, a process that the cell handover message is sent to the terminal is described as follows.

Firstly, it is determined, according to the position information in the measurement report, whether the terminal enters into the ground mobile communication network, if so, information of a fourth cell closest to the terminal position information is acquired, and the fourth cell is determined as the target cell, and the fourth cell is a cell of the ground mobile network.

Next, configuration information for the terminal to carry out signal measurement on the fourth cell is sent to the terminal, and the terminal measures signal strength of the fourth cell based on the configuration information.

Then, the measurement report that is returned by the terminal and about the signal strength of the fourth cell is received.

Finally, if the signal strength of the fourth cell in the measurement report reaches a preset value, the cell handover message is sent to the terminal.

For example, with FIG. 4 as an example again, the current cell of the UE is the cell 1 governed by the satellite, the cell 1 governed by the satellite configures, to the UE, a configuration message for measuring a neighbor cell, the UE is required by the configuration message to report the position information itself (such as GPS position), the position information may be configured with the reporting occasion, and the reporting occasion may mean that the position information is periodically reported (for example, the position information is reported once every other 10 min) or reported after a set triggering condition is satisfied. The position information may be reported without repeated configuration, for example, the UE may be configured when the UE enters into a connected state for the first time, and reconfiguration may be carried out if a reporting period is required to be regulated subsequently. It should be noted that not every cell needs to configure UE position information reporting for the UE.

After receiving the configuration message for reporting the position information itself, the UE measures and reports a precise position of itself according to the configuration message and can also report terminal moving information (such as moving speed such as a static state, low speed, medium speed and high speed, a moving direction and a type of the UE) of itself.

The base station in the satellite A knows a specific coverage range of each current beam on the ground according to moving speed and positioning information of the satellite A, and furthermore, a new coverage range of the current beam on the ground after the specified time may be calculated. Therefore, a geographical position of the UE in the current cell and an approximate distance from the UE to a specified neighbor cell may be determined in combination with the terminal position information reported by the UE or the terminal position information and the terminal moving information, and furthermore, the time of a beam corresponding to a neighbor cell which the UE enters into is predicted.

After the base station in the satellite A determines, according to the above-mentioned method, that the UE moves to the area co-covered by the cells 1 and 2, the UE is handed over to the cell 2, and a handover message is sent to the UE, and the UE initiates synchronization and access to the cell 2 according to configuration information in the handover message.

Similarly, after the UE is handed over to the cell 2, the base station in the satellite A configures new neighbor cells such as neighbor cells 1, 3, 6 and 9 to the UE. A process that the UE is subsequently handed over from the cell 2 to the cell 5 is similar to the above-mentioned process of handover from the cell 1 to the cell 2, and the descriptions thereof are omitted herein.

For another example, with FIG. 5 as an example again, a precondition is the same as the above-mentioned condition in FIG. 5.

The current cell of the UE is the cell 5 governed by the satellite A, the cell 5 sends a configuration message for the terminal to carry out terminal position information measurement to the UE, the UE reports a precise position of itself according to the configuration message and can also report terminal moving information (such as moving speed such as a static state, low speed, medium speed and high speed, a moving direction and a type of the UE) of itself.

After the base station in the satellite A receives the measurement report, which is reported by the UE and includes the terminal position information and/or the terminal moving information, the specific coverage range of each current beam on the ground is determined according to the moving speed and the positioning information of the satellite A, and furthermore, the coverage range of the beam of each cell on the ground after the specified time is calculated. The geographical position of the UE in the current cell and the approximate distance from the UE to the neighbor cell may be determined by the satellite A in combination with the terminal moving information and the terminal position information of the UE, and furthermore, a time range when the UE enters into a target cell is predicted.

After the base station in the satellite A determines, according to the above-mentioned method, that the UE moves to the area co-covered by the cell 5 and the cell 11, and when a specified moment within the specified time range is reached, the base station in the satellite A sends the cell handover message to the UE, and the UE is handed over from the cell 5 governed by the satellite A to the cell 11 governed by the satellite B.

After the base station in the satellite A determines that the specified condition allowing the UE to carry out cell handover is satisfied, the satellite A and the satellite B carry out handover preparation. If there is a direct interface (similar to an Xn/X2 interface) between the satellite A and the satellite B, a handover preparation process (similar to Xn/X2 handover) will be carried out through the direct interface; otherwise, handover preparation (similar to NG/Xn handover) is completed by virtue of a core network, and a specific handover preparation process of the satellite A and the satellite B is not described in detail and may refer to a handover process of Xn/X2 or NG/Xn in the prior art. Then, the base station in the satellite A sends a handover message to the UE, and the UE initiates synchronization and access to the cell 11 according to the configuration of the handover message.

Figure 6:
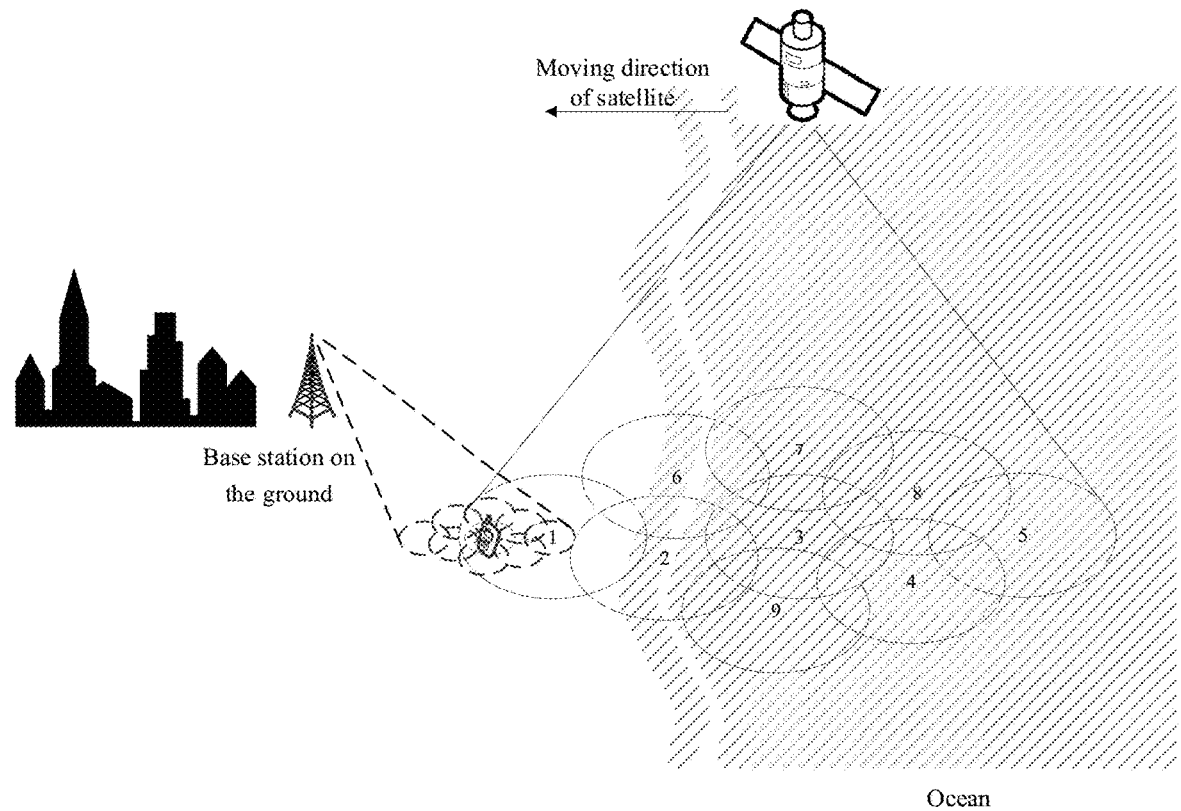
FIG. 6 is a schematic diagram showing that a terminal provided by an embodiment of the present application is handed over from a cell of a non-ground mobile communication network to a cell of a ground mobile communication network.

For another example, referring to FIG. 6, a schematic diagram showing that a terminal is handed over from a cell of a non-ground mobile communication network to a cell of a ground mobile communication network is shown.

For example, an oceangoing freighter (equivalent to the terminal) reaches a port, and there is only the satellite(s), i.e., the non-ground mobile communication network, providing communication services for the oceangoing freighter during oceangoing freight. It is possible that the port is also located within the coverage range of a satellite, but the port is covered by a traditional ground mobile network (a base station on the ground).

If the current cell of the terminal is the cell 1 governed by the satellite A, the terminal will enter into the coverage range of the cell 11, the cell 12 and the cell 13 covered by the ground mobile network (the base station on the ground).

The cell 1 governed by the satellite A sends, to the terminal, a configuration message for the terminal to carry out terminal position information measurement, and the terminal periodically reports terminal position information itself according to the configuration message.

After the satellite receives a measurement report including terminal position information, it is determined, according to the terminal position information and position information of the base station on the ground, that the terminal enters into a coverage area such as a city/port which is covered better by the ground mobile network.

The cell 1 governed by the satellite A configures, to the terminal, a configuration message for the terminal to carry out neighbor cell signal measurement, and the configuration message includes the cells such as the cells 11, 12 and 13 of the ground mobile network, such as that the terminal measures signal strength of the cells 11, 12 and reports the signal strength after a specified condition is satisfied.

After the base station in the satellite receives the measurement report from the terminal, it is determined, according to the signal strength of each cell in the measurement report, that the terminal is handed over to the cell 11 covered by the ground mobile network (that is, the cell 11 is used as the target cell).

Then, a handover preparation process is completed between the base station in the satellite and the base station on the ground corresponding to the cell 11 through the Xn/NG interface, and a handover message is sent to the terminal, and the terminal initiates synchronization and access to the cell 11 according to configuration of the handover message.

In a process that a cell of the non-ground mobile communication network and a cell of the ground mobile communication network are handed over, a processing method of the ground mobile communication network is described as follows.

Figure 7:
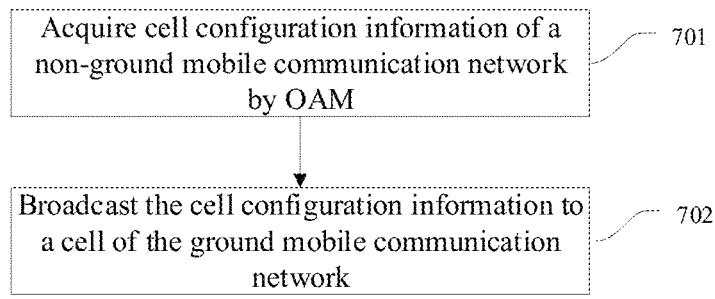
FIG. 7 is a flow diagram showing a mobility management method for a ground mobile communication network side according to an embodiment of the present application.

Referring to FIG. 7, based on the same inventive concept, an embodiment of the present application provides a mobility management method applied to a ground mobile communication network. Processes the method are described as follows.

Step 701: cell configuration information of a non-ground mobile communication network is acquired by OAM.

Step 702: the cell configuration information is broadcast to a cell of the ground mobile communication network.

The cell configuration information is beam information of the non-ground mobile communication network.

When handover is carried out between the cell of the non-ground mobile communication network and the cell of the ground mobile communication network, the ground mobile communication network can acquire the cell configuration information of the non-ground mobile communication network by OAM. After being acquired, the cell configuration information of the non-ground mobile communication network may be broadcast to the cell of the ground mobile communication network in a broadcast way.

In a process that the handover is carried out between a cell of the non-ground mobile communication network and a target cell, a processing method performed by the terminal is described as follows.

Figure 8:
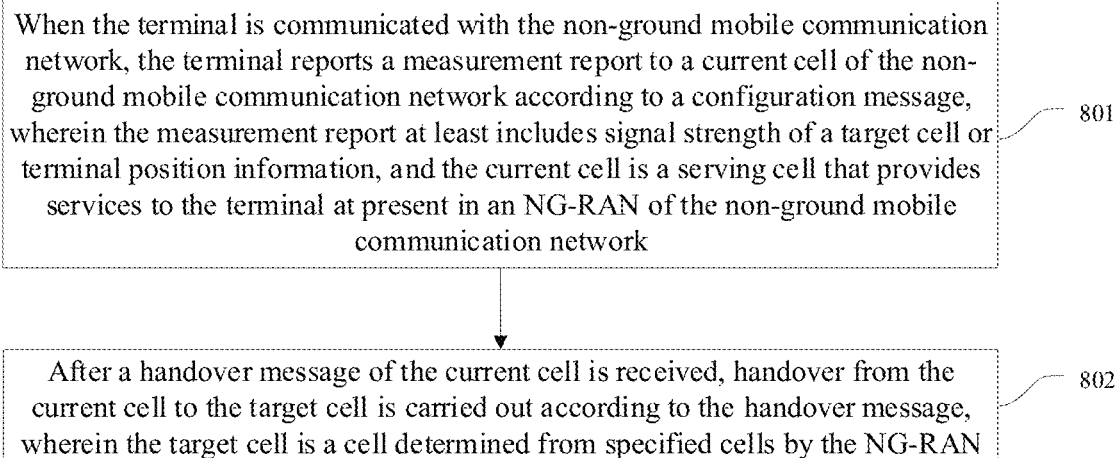
FIG. 8 is a flow diagram showing a mobility management method for a terminal side according to an embodiment of the present application.

Referring to FIG. 8, based on the same inventive concept, an embodiment of the present application provides a mobility management method applied to a terminal. Processes the method are described as follows.

Step 801: when the terminal is communicated with the non-ground mobile communication network, the terminal reports a measurement report to a current cell of the non-ground mobile communication network according to a configuration message, and the measurement report at least includes signal strength of a target cell or terminal position information, and the current cell is a serving cell that provides services to the terminal at present in an NG-RAN of the non-ground mobile communication network.

In one embodiment, the measurement report is reported to the current cell of the ground mobile communication network according to the configuration message. According to different measurement contents required in the configuration message, there are two processing ways described as follows.

First way: if the signal strengths of the specified cells are required to be returned in the configuration message, the measurement report carrying signal strengths of the specified cells is reported to the current cell when the signal strength of any one cell in the specified cells reaches a set threshold.

Second way: if the terminal position information is required to be returned in the configuration message, the terminal reports the measurement report carrying the terminal position information to the current cell regularly or when a preset condition is satisfied.

Step 802: after a handover message of the current cell is received, handover from the current cell to the target cell is carried out according to the handover message, and the target cell is a cell determined from specified cells by the NG-RAN.

For example, when the terminal is communicated with the non-ground mobile communication network, the configuration message sent by the current cell of the non-ground mobile communication network is a message requiring to return the signal strength of specified cells 1 to 3 and the measurement report is reported when the signal strength is greater than the set threshold M.

When the terminal detects that the set threshold of the cell 2 is M, the signal strengths, which are respectively M+8, M and M−3, of the cells 1 to 3 are reported to the current cell, and the current cell may determine, according to the above-mentioned signal strengths, that the cell 1 corresponding to the signal strength of M+8 is used as the target cell to be handed over.

If the configuration message is a message requiring the terminal to return the position information periodically (such as every other 20 min), the terminal reports the terminal position information (such as GPS information) of itself once every other 20 min, and may also report the terminal moving information such as the moving speed, the moving direction and/or the type of the terminal. The type of the terminal may be, for example, the ground (a user using a mobile phone is located on the ground), a train (a user using a mobile phone is located on a train), an airplane (a user using a mobile phone is located on an airplane) and a ship (a user using a mobile phone is located on a ship).

Figure 9:
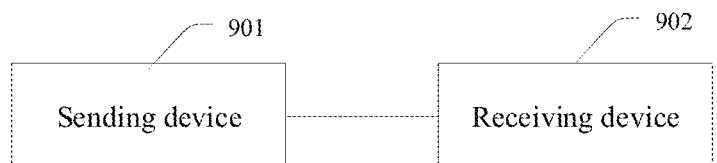
FIG. 9 and FIG. 12 are schematic diagrams showing a structure of an NG-RAN of a non-ground mobile communication network according to an embodiment of the present application.

Based on the same inventive concept, an embodiment of the present application provides a radio access network for mobility management. The radio access network belongs to a non-ground mobile communication network. A specific implementation of a mobility management method of the radio access network may refer to the description in the embodiment of the method, and the descriptions thereof are omitted herein. Referring to FIG. 9, the radio access network includes:

a sending device 901, configured to send, to a terminal, a configuration message for the terminal to carry out neighbor cell signal measurement or position measurement, and the terminal reports, according to the configuration message, the neighbor cell signal strength or terminal position information, and the terminal position information includes GPS position information of the terminal; and a receiving device 902, configured to, determine, according to position information of the NG-RAN and a measurement report, whether a specified condition allowing the terminal to carry out neighbor cell handover is satisfied, after the measurement report, which is reported by the terminal and includes the neighbor cell signal strength or the terminal position information, is received; and send a cell handover message to the terminal to handover the terminal from a current cell to a target cell, if the specified condition allowing the terminal to carry out the neighbor cell handover is satisfied, and the specified condition is a condition allowing the terminal to carry out the neighbor cell handover.

In one embodiment, when the configuration message for the terminal to carry out neighbor cell signal measurement is sent to the terminal, the configuration message includes: information of a first neighbor cell beam adjacent to a beam serving the terminal at present, and the terminal can carry out cell handover in the NG-RAN, of the non-ground mobile communication network, of the non-ground mobile communication network, and the first neighbor cell beam is a beam corresponding to the target cell in the NG-RAN; or information of a second neighbor cell beam of a neighbor NG-RAN adjacent to the NG-RAN of the non-ground mobile communication network, and the terminal can carry out cell handover among different NG-RANs of the non-ground mobile communication network, and the second neighbor cell beam is a beam corresponding to the target cell; or information of a third neighbor cell of a ground mobile network, and the terminal carries out cell handover between the non-ground mobile communication network and the ground mobile network, and a beam of the third neighbor cell is a beam corresponding to the target cell, and the ground mobile network is adjacent to the NG-RAN of the non-ground mobile communication network.

In one embodiment, when the configuration message for the terminal to carry out the terminal position information measurement is sent to the terminal, the configuration message includes: the terminal position information, or terminal moving information and the terminal position information, and the terminal moving information includes moving speed, a moving direction and a type of the terminal; and a reporting occasion of the configuration message, and the reporting occasion is a moment when a moving state of the terminal is rapidly changed or a reporting period.

In one embodiment, the specified condition means that: a difference between signal strength of the target cell and signal strength of the current cell in the measurement report is greater than a first threshold, and the first threshold is a critical value at which the terminal is required to carry out cell handover; and/or a cell load of the target cell is smaller than a second threshold, and the second threshold is a critical value at which the target cell allows entry of the terminal from the current cell.

In one embodiment, the receiving device 902 is configured to: predict, according to the terminal position information in the measurement report and moving speed and positioning information of the NG-RAN, or according to the terminal position information and the terminal moving information as well as the moving speed and positioning information of the NG-RAN, a time range in which the terminal reaches an area co-covered by the current cell and the target cell; and send the cell handover message to the terminal in the condition that a specified moment within the time range is reached.

In one embodiment, the receiving device 902 is configured to: within a specified time range, predict, according to the moving speed and positioning information of the NG-RAN, a moving track, of a cell corresponding to each beam in the NG-RAN, on the ground; within the specified time range, determine the current position of the terminal and predict a moving track of the terminal according to the terminal position information or the terminal position information and the terminal moving information; and determine, according to the moving track, of the cell corresponding to each beam in the NG-RAN, on the ground and the moving track of the terminal, the time range in which the terminal reaches the area co-covered by the current cell and the target cell.

In one embodiment, the receiving device 902 is further configured to: determine, according to the terminal position information in the measurement report, whether the terminal enters into a ground mobile communication network, if so, acquire information of a fourth cell closest to the terminal position information, and determine the fourth cell as the target cell, and the fourth cell is a cell of the ground mobile network; send, to the terminal, configuration information for the terminal to carry out signal measurement on the fourth cell, and the terminal measures signal strength of the fourth cell based on the configuration information; receive the measurement report that is returned by the terminal and about the signal strength of the fourth cell; and send the cell handover message to the terminal, if the signal strength of the fourth cell in the measurement report reaches a preset value.

Figure 10:
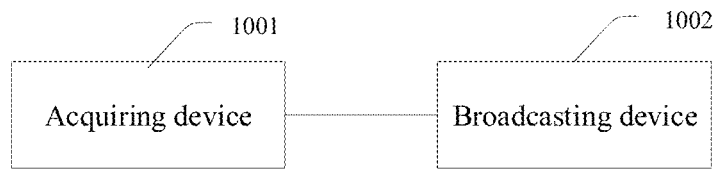
FIG. 10 and FIG. 13 are schematic diagrams showing a structure of an RAN of a ground mobile communication network according to an embodiment of the present application.

Based on the same inventive concept, an embodiment of the present application provides a radio access network for mobility management. The radio access network belongs to a ground mobile communication network. A specific implementation of a mobility management method of the radio access network may refer to the description in the method of the embodiment, the descriptions thereof are omitted herein. Referring to FIG. 10, the radio access network includes: an acquiring device 1001, configured to acquire cell configuration information of a non-ground mobile communication network by OAM; and a broadcasting device 1002, configured to broadcast the cell configuration information to a cell of the ground mobile communication network.

In one embodiment, the cell configuration information is beam information of the non-ground mobile communication network.

Figure 11:
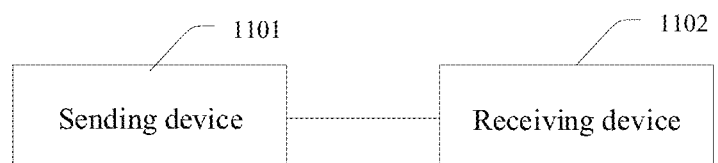
FIG. 11 and FIG. 14 are schematic diagrams showing a structure of a terminal according to an embodiment of the present application.

Based on the same inventive concept, an embodiment of the present application provides a terminal for mobility management. A specific implementation of a mobility management method of the terminal may refer to the description in the embodiment of the method, and the descriptions thereof are omitted herein. Referring to FIG. 11, the terminal includes:

a sending device 1101, configured to report a measurement report to a current cell of the non-ground mobile communication network according to a configuration message, in the condition that the terminal is communicated with a non-ground mobile communication network, and the measurement report at least includes the signal strength of a target cell or terminal position information, and the current cell is a serving cell that provides services to the terminal at present in an NG-RAN of the non-ground mobile communication network; and a receiving device 1102, configured to carry out handover from the current cell to the target cell according to a handover message, after the handover message of the current cell is received.

In one embodiment, the sending device 1101 is configured to report, to the current cell, the measurement report carrying signal strengths of the specified cells when the signal strength of any one cell in the specified cells reaches a set threshold, if the signal strengths of specified cells are required to be returned in the configuration message.

In one embodiment, the sending device 1101 is further configured to report the measurement report carrying the terminal position information to the current cell regularly or in the condition that a preset condition is satisfied, if the terminal position information is required to be returned in the configuration message.

Figure 12:
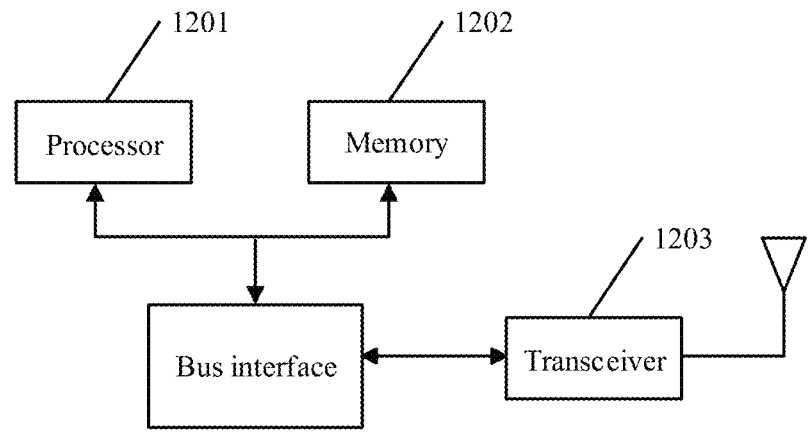

As shown in FIG. 12, an embodiment of the present application provides an NG-RAN of a non-ground mobile communication network. The NG-RAN includes a processor 1201, a memory 1202 and a transceiver 1203, and the processor 1201 is configured to read a program in the memory 1202 to:

send a configuration message for the terminal to carry out neighbor cell signal measurement or position measurement a terminal, and the terminal reports, according to the configuration message, neighbor cell signal strength or terminal position information, and the terminal position information includes GPS position information of the terminal; and determine, according to position information of the NG-RAN and a measurement report, whether a specified condition allowing the terminal to carry out neighbor cell handover is satisfied, after the measurement report, which is reported by the terminal and includes the neighbor cell signal strength or the terminal position information, is received, and send a cell handover message to the terminal to handover the terminal from a current cell to a target cell, if the specified condition allowing the terminal to carry out the neighbor cell handover is satisfied, and the specified condition is a condition allowing the terminal to carry out the neighbor cell handover.

In one embodiment, when the configuration message for the terminal to carry out neighbor cell signal measurement is sent to the terminal, the configuration message includes: information of a first neighbor cell beam adjacent to a beam serving the terminal at present, and the terminal can carry out cell handover in the NG-RAN of the non-ground mobile communication network, and the first neighbor cell beam is a beam corresponding to the target cell in the NG-RAN; or information of a second neighbor cell beam of a neighbor NG-RAN, of the non-ground mobile communication network, adjacent to the NG-RAN of the non-ground mobile communication network, and the terminal can carry out cell handover among different NG-RANs of the non-ground mobile communication network, and the second neighbor cell beam is a beam corresponding to the target cell; or information of a third neighbor cell of a ground mobile network, and the terminal carries out cell handover between the non-ground mobile communication network and the ground mobile network, and a beam of the third neighbor cell is a beam corresponding to the target cell, and the ground mobile network is adjacent to the NG-RAN of the non-ground mobile communication network.

In one embodiment, when the configuration message for the terminal to carry out the terminal position information measurement is sent to the terminal, the configuration message includes: the terminal position information, or terminal moving information and the terminal position information, and the terminal moving information includes moving speed, a moving direction and a type of the terminal; and a reporting occasion of the configuration message, and the reporting occasion is a moment in the condition that a moving state of the terminal is rapidly changed or a reporting period.

In one embodiment, the specified condition means that: a difference between signal strength of the target cell and signal strength of the current cell in the measurement report is greater than a first threshold, and the first threshold is a critical value at which the terminal is required to carry out cell handover; and/or a cell load of the target cell is smaller than a second threshold, and the second threshold is a critical value at which the target cell allows entry of the terminal from the current cell.

In one embodiment, the processor 1201 is configured to: predict, according to the terminal position information in the measurement report and moving speed and positioning information of the NG-RAN, or according to the terminal position information and the terminal moving information as well as the moving speed and positioning information of the NG-RAN, a time range in which the terminal reaches an area co-covered by the current cell and the target cell; and send the cell handover message to the terminal in the condition that a specified moment within the time range is reached.

In one embodiment, the processor 1201 is configured to: within a specified time range, predict, according to the moving speed and positioning information of the NG-RAN, a moving track, of a cell corresponding to each beam in the NG-RAN, on the ground; within the specified time range, determine the current position of the terminal and predict a moving track of the terminal according to the terminal position information or the terminal position information and the terminal moving information; and determine, according to the moving track, of the cell corresponding to each beam in the NG-RAN, on the ground and the moving track of the terminal, the time range in which the terminal reaches the area co-covered by the current cell and the target cell.

In one embodiment, the processor 1201 is further configured to: determine, according to the terminal position information in the measurement report, whether the terminal enters into a ground mobile communication network, if so, acquire information of a fourth cell closest to the terminal position information, and determine the fourth cell as the target cell, and the fourth cell is a cell of the ground mobile network; send, to the terminal, configuration information for the terminal to carry out signal measurement on the fourth cell, and the terminal measures signal strength of the fourth cell based on the configuration information; receive the measurement report that is returned by the terminal and about the signal strength of the fourth cell; and send the cell handover message to the terminal, if the signal strength of the fourth cell in the measurement report reaches a preset value.

The processor 1201 takes charge of managing a bus architecture and general processing, and the memory 1202 is capable of storing data used when the processor 1201 executes an operation. The transceiver 1203 is configured to receive and send data under the control of the processor 1201.

The bus architecture may include any number of buses and bridges interconnected with each other and is configured to link various circuits of one or more processors 1201 represented by the processor 1201 and a memory 1202 represented by the memory 1202 together. The bus architecture is also capable of linking various other circuits such as peripheral equipment, a voltage stabilizer and a power management circuit together. Therefore, the further description of the bus architecture is omitted herein. A bus interface is provided with an interface. The processor 1201 takes charge of managing the bus architecture and general processing, and the memory 1202 is capable of storing data used when the processor 1201 executes an operation.

The processes disclosed by the embodiments of the present application may be applied to the processor 1201 or implemented by the processor 1201. During implementation, all steps of the above-mentioned processes may be completed by an integrated logic circuit in a hardware form or an instruction in a software form in the processor 1201. The processor 1201 may be a general-purpose processor 1201, a digital signal processor 1201, a specific integrated circuit, a field-programmable gate array or other programmable logic devices, a discrete gate or transistor logic device and a discrete hardware component and may implement or execute all the methods, steps and logic block diagrams disclosed in the embodiments of the present application. The general-purpose processor 1201 may be a microprocessor 1201 or any conventional processor 1201 and the like. The steps of the methods disclosed in the embodiments of the present application may be directly embodied to be executed and completed by a hardware processor 1201 or executed and completed by combination of hardware and software modules in the processor 1201. The software module may be located in a storage medium, such as a random access memory 1202, a flash memory, a read-only memory 1202, a programmable read-only memory 1202 or an electrically erasable and programmable memory 1202 and a register, which is mature in the art. The storage medium is located in the memory 1202, the processor 1201 reads information in the memory 1202, and the steps of the above-mentioned processing flows are completed in combination with hardware of the processor 1201.

Figure 13:
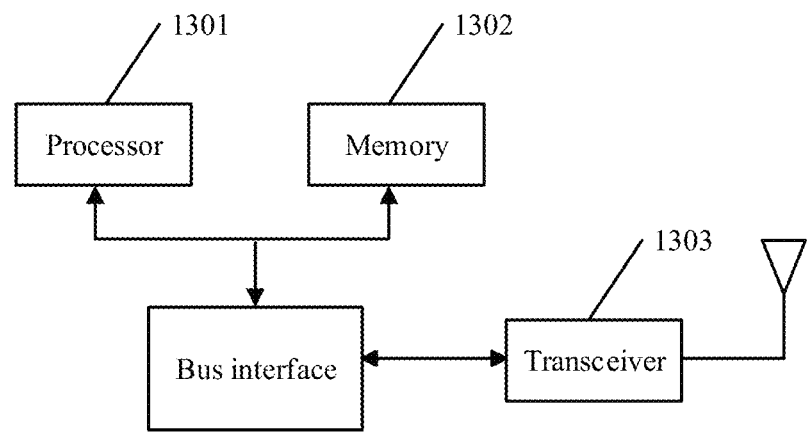

As shown in FIG. 13, an embodiment of the present application provides an NG-RAN of a ground mobile communication network. The NG-RAN includes a processor 1301, a memory 1302 and a transceiver 1303, and the processor 1301 is configured to read a program in the memory 1302 to: acquire cell configuration information of a non-ground mobile communication network by OAM; and broadcast the cell configuration information to a cell of the ground mobile communication network.

In one embodiment, the cell configuration information is beam information of the non-ground mobile communication network.

The processor 1301 takes charge of managing a bus architecture and general processing, and the memory 1302 is capable of storing data used when the processor 1301 executes an operation. The transceiver 1303 is configured to receive and send data under the control of the processor 1301.

The bus architecture may include any number of buses and bridges interconnected with each other and is configured to link various circuits of one or more processors 1301 represented by the processor 1301 and a memory 1302 represented by the memory 1302 together. The bus architecture is also capable of linking various other circuits such as peripheral equipment, a voltage stabilizer and a power management circuit together. Therefore, the further description of the bus architecture is omitted herein. A bus interface is provided with an interface. The processor 1301 takes charge of managing the bus architecture and general processing, and the memory 1302 is capable of storing data used when the processor 1301 executes an operation.

The processes disclosed by the embodiments of the present application may be applied to the processor 1301 or implemented by the processor 1301. During implementation, all steps of the above-mentioned processing flows may be completed by an integrated logic circuit in a hardware form or an instruction in a software form in the processor 1301. The processor 1301 may be a general-purpose processor 1301, a digital signal processor 1301, a specific integrated circuit, a field-programmable gate array or other programmable logic devices, a discrete gate or transistor logic device and a discrete hardware component and may implement or execute all the methods, steps and logic block diagrams disclosed in the embodiments of the present application. The general-purpose processor 1301 may be a microprocessor 1301 or any conventional processor 1301 and the like. The steps of the methods disclosed in the embodiments of the present application may be directly embodied to be executed and completed by a hardware processor 1301 or executed and completed by combination of hardware and software modules in the processor 1301. The software module may be located in a storage medium, such as a random access memory 1302, a flash memory, a read-only memory 1302, a programmable read-only memory 1302 or an electrically erasable and programmable memory 1302 and a register, which is mature in the art. The storage medium is located in the memory 1302, the processor 1301 reads information in the memory 1302, and the steps of the above-mentioned processing flows are completed in combination with hardware of the processor 1301.

Figure 14:
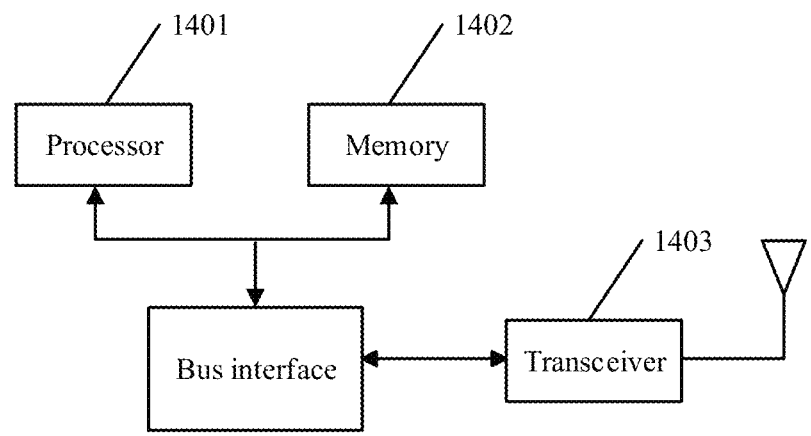

As shown in FIG. 14, an embodiment of the present application provides a terminal. The terminal includes a processor 1401, a memory 1402 and a transceiver 1403, and the processor 1401 is configured to read a program in the memory to: when the terminal is communicated with a non-ground mobile communication network, report a measurement report to a current cell of the non-ground mobile communication network according to a configuration message, and the measurement report at least includes signal strength of a target cell or terminal position information, and the current cell is a serving cell that provides services to the terminal at present in an NG-RAN of the non-ground mobile communication network; and carry out handover from the current cell to the target cell according to the handover message, after a handover message of the current cell is received.

In one embodiment, the processor 1401 is configured to: if the signal strengths of specified cells are required to be returned in the configuration message, report, to the current cell, the measurement report carrying the signal strengths of the specified cells when the signal strength of any one cell in the specified cells reaches a set threshold.

In one embodiment, the processor 1401 is further configured to: if the terminal position information is required to be returned in the configuration message, report the measurement report carrying the terminal position information to the current cell regularly or in the condition that a preset condition is satisfied.

The processor 1401 takes charge of managing a bus architecture and general processing, and the memory 1402 is capable of storing data used when the processor 1401 executes an operation. The transceiver 1403 is configured to receive and send data under the control of the processor 1401.

The bus architecture may include any number of buses and bridges interconnected with each other and is used for linking various circuits of one or more processors 1401 represented by the processor 1401 and a memory 1402 represented by the memory 1402 together. The bus architecture is also capable of linking various other circuits such as peripheral equipment, a voltage stabilizer and a power management circuit together. Therefore, the further description of the bus architecture is omitted herein. A bus interface is provided with an interface. The processor 1401 takes charge of managing the bus architecture and general processing, and the memory 1402 is capable of storing data used when the processor 1401 executes an operation.

The processes disclosed by the embodiments of the present application may be applied to the processor 1401 or implemented by the processor 1401. During implementation, all steps of the above-mentioned processing flows may be completed by an integrated logic circuit in a hardware form or an instruction in a software form in the processor 1401. The processor 1401 may be a general-purpose processor 1401, a digital signal processor 1401, a specific integrated circuit, a field-programmable gate array or other programmable logic device, a discrete gate or transistor logic device and a discrete hardware component and may implement or execute all the methods, steps and logic block diagrams disclosed in the embodiments of the present application. The general-purpose processor 1401 may be a microprocessor 1401 or any conventional processor 1401 and the like. The steps of the methods disclosed in the embodiments of the present application may be directly embodied to be executed and completed by a hardware processor 1401 or executed and completed by combination of hardware and software modules in the processor 1401. The software module may be located in a storage medium, such as a random access memory 1402, a flash memory, a read-only memory 1402, a programmable read-only memory 1402 or an electrically erasable and programmable memory 1402 and a register, which is mature in the art. The storage medium is located in the memory 1402, the processor 1401 reads information in the memory 1402, and the steps of the above-mentioned processing flows are completed in combination with hardware of the processor 1401.

Based on the same inventive concept, an embodiment of the present application provides a computer readable storage medium. The computer readable storage medium stores a computer instruction. When the computer instruction runs on a computer, the computer is enabled to execute the above-mentioned mobility management method applied to the non-ground mobile communication network or the ground mobile communication network or the terminal.

In the embodiments provided by the present application, the configuration message for the terminal to carry out neighbor cell signal measurement or position measurement is sent to the terminal through the non-ground mobile communication network, and the terminal reports, according to the configuration message, neighbor cell signal strength or terminal position information; and after the measurement report, which is reported by the terminal and includes the neighbor cell signal strength or the terminal position information, is received, according to the measurement report and position information of the NG-RAN, it is determined whether the specified condition allowing the terminal to carry out neighbor cell handover is satisfied, and if so, the cell handover message is sent to the terminal, and the terminal is handed over from the current cell to the target cell, and the terminal position information includes the GPS position information of the terminal, and the specified condition is the condition allowing the terminal to carry out neighbor cell handover. Therefore, the signaling load and the handover delay of the NG-RAN are reduced when cell handover is carried out in the non-ground mobile communication network.

The embodiments of the present application may provide a method, a system or a computer program product. Therefore, a form of an embodiment in which hardware is completely adopted, an embodiment in which software is completely adopted or an embodiment in which software is combined with hardware may be adopted in the present application. Moreover, a computer program product form implemented on one or more readable storage mediums (which include, but are not limited to a magnetic disk memory, a CD-ROM, an optical memory and the like) including computer available program codes may be adopted in the embodiments of the present application.

The embodiments of the present application are described with reference to a flow diagram and/or a block diagram of the method, equipment (system) and the computer program product according to the embodiments of the present application. It should be understood that each flow and/or block in the flow diagram and/or the block diagram and a combination of flows and/or blocks in the flow diagram and/or the block diagram may be achieved by computer program instructions. The computer program instructions may be provided for a processor of a general-purpose computer, a special-purpose computer, an embedded processing machine or other programmable data processing equipment to generate a machine, and a device used for achieving a specified function in one or more flows in the flow diagram and/or one or more blocks in the block diagram is generated by an instruction executed by the processor of the computer or other programmable data processing equipment.

These computer program instructions may also be stored in a computer readable storage capable of guiding the computer or other programmable data processing equipment to work in a specific way, so that a manufactured product including instruction device is generated by the instruction stored in the computer readable storage, and the instruction device achieves the specified function in one or more flows in the flow diagram and/or one or more blocks in the block diagram.

These computer program instructions may also be mounted on the computer or other programmable data processing equipment, and then, a series of operation steps are carried out on the computer or other programmable data processing equipment to generate processing realized by the computer, so that the instructions executed on the computer or other programmable data processing equipment provide the step of achieving the specified function in one or more flows in the flow diagram and/or one or more blocks in the block diagram.

What is claimed is:

1. A mobility management method, applied to an NG-RAN (Next Generation-Radio Access Network) of a non-ground mobile communication network, wherein the mobility management method comprises:

sending, to a terminal, a configuration message for the terminal to carry out neighbor cell signal measurement and position measurement, such that the terminal reports, according to the configuration message, neighbor cell signal strength and terminal position information, wherein the terminal position information comprises GPS (Global Positioning System) position information of the terminal;

wherein the configuration message that is sent to the terminal is used for the terminal to carry out the terminal position information measurement, and the configuration message comprises the terminal position information, or terminal moving information and the terminal position information, and a reporting occasion of the configuration message; and the terminal moving information comprises moving speed, a moving direction and a type of the terminal, and the reporting occasion is a moment in the condition that a moving state of the terminal is rapidly changed or a reporting period;

determining, according to position information of the NG-RAN and a measurement report that is sent by the terminal upon the terminal determining the reporting occasion has arrived, whether a specified condition allowing the terminal to carry out a neighbor cell handover is satisfied, after the measurement report, which is reported by the terminal and comprises the neighbor cell signal strength or the terminal position information, is received; and sending a cell handover message to the terminal to handover the terminal from a current cell of the non-ground mobile communication network to a target cell of a ground mobile network, when the specified condition allowing the terminal to carry out the neighbor cell handover is satisfied, wherein the specified condition is a condition allowing the terminal to carry out the neighbor cell handover;

wherein the sending the cell handover message to the terminal, when the specified condition allowing the terminal to carry out the neighbor cell handover is satisfied, comprises:

predicting, according to the terminal position information in the measurement report and a moving speed and the positioning information of the NG-RAN, or according to the terminal position information and the terminal moving information as well as the moving speed and positioning information of the NG-RAN, a time range in which the terminal reaches an area co-covered by the current cell and the target cell, wherein the predicting comprises:
  within a specified time range, predicting, according to the moving speed and positioning information of the NG-RAN, a moving track, of a cell corresponding to each beam in the NG-RAN of the non-ground mobile communication network, on the ground;
  within the specified time range, predicting a moving track of the terminal according to the terminal position information or the terminal position information and the terminal moving information; and
  determining, according to the moving track of the cell corresponding to each beam in the NG-RAN of the non-ground mobile communication network, on the ground, and the moving track of the terminal, the time range in which the terminal reaches the area co-covered by the current cell and the target cell; and
  sending the cell handover message to the terminal to handover the terminal from the current cell of the non-ground mobile communication network to the target cell of the ground mobile network on the condition that a specified moment within the time range is reached.

2. The method according to claim 1, wherein the configuration message is sent to the terminal and is used for the terminal to carry out neighbor cell signal measurement, and the configuration message comprises:
  information of a first neighbor cell beam adjacent to a beam serving the terminal at present, such that the terminal carries out cell handover in the NG-RAN of the non-ground mobile communication network, wherein the first neighbor cell beam is a beam corresponding to the target cell in the NG-RAN; or
  information of a second neighbor cell beam of a neighbor NG-RAN, of the non-ground mobile communication network, adjacent to the NG-RAN of the non-ground mobile communication network, such that the terminal carries out cell handover among different NG-RANs of the non-ground mobile communication network, wherein the second neighbor cell beam is a beam corresponding to the target cell; or
  information of a third neighbor cell of a ground mobile network, such that the terminal carries out cell handover between the non-ground mobile communication network and the ground mobile network, wherein a beam of the third neighbor cell is a beam corresponding to the target cell, and the ground mobile network is adjacent to the NG-RAN of the non-ground mobile communication network.

3. The method according to claim 2, wherein in the condition that the configuration message is sent to the terminal and is used for the terminal to carry out neighbor cell signal measurement, the specified condition specifically means that:
  a difference between signal strength of the target cell and signal strength of the current cell in the measurement report is greater than a first threshold, wherein the first threshold is a critical value at which the terminal is required to carry out cell handover; and/or
  a cell load of the target cell is smaller than a second threshold, wherein the second threshold is a critical value at which the target cell allows entry of the terminal from the current cell.

4. The method according to claim 1, wherein in the condition that the configuration message is sent to the terminal and is used for the terminal to carry out the terminal position information measurement, the sending the cell handover message to the terminal, if the specified condition allowing the terminal to carry out the neighbor cell handover is satisfied, comprises:
  determining, according to the terminal position information in the measurement report, whether the terminal enters into a ground mobile communication network, if so, acquiring information of a fourth cell closest to the terminal position information, and determining the fourth cell as the target cell, wherein the fourth cell is a cell of the ground mobile network;
  sending, to the terminal, configuration information for the terminal to carry out signal measurement on the fourth cell, such that the terminal measures signal strength of the fourth cell based on the configuration information;
  receiving the measurement report that is returned by the terminal and about the signal strength of the fourth cell; and
  sending the cell handover message to the terminal, if the signal strength of the fourth cell in the measurement report reaches a preset value.

5. An NG-RAN (Next Generation-Radio Access Network) of a non-ground mobile communication network, wherein the NG-RAN comprises a processor, a memory and a transceiver, wherein the processor is configured to read a program in the memory to perform the method according to claim 1.

6. The NG-RAN according to claim 5, wherein the configuration message is sent to the terminal and is used for the terminal to carry out neighbor cell signal measurement, and the configuration message comprises:
  information of a first neighbor cell beam adjacent to a beam serving the terminal at present, such that the terminal carries out cell handover in the NG-RAN of the non-ground mobile communication network, wherein the first neighbor cell beam is a beam corresponding to the target cell in the NG-RAN; or
  information of a second neighbor cell beam of a neighbor NG-RAN, of the non-ground mobile communication network, adjacent to the NG-RAN of the non-ground mobile communication network, such that the terminal carries out cell handover among different NG-RANs of the non-ground mobile communication network, wherein the second neighbor cell beam is a beam corresponding to the target cell; or
  information of a third neighbor cell of a ground mobile network, such that the terminal carries out cell handover between the non-ground mobile communication network and the ground mobile network, wherein a beam of the third neighbor cell is a beam corresponding to the target cell, and the ground mobile network is adjacent to the NG-RAN of the non-ground mobile communication network.

7. The NG-RAN according to claim 6, wherein in the condition that the configuration message is sent to the terminal and is used for the terminal to carry out neighbor cell signal measurement, the specified condition specifically means that:
  a difference between signal strength of the target cell and signal strength of the current cell in the measurement report is greater than a first threshold, wherein the first threshold is a critical value at which the terminal is required to carry out cell handover; and/or a cell load of the target cell is smaller than a second threshold, wherein the second threshold is a critical value at which the target cell allows entry of the terminal from the current cell.

8. The NG-RAN according to claim 5, wherein in the condition that the configuration message is sent to the terminal and is used for the terminal to carry out the terminal position information measurement, the processor is specifically configured to:

within a specified time range, predict, according to the moving speed and positioning information of the NG-RAN, a moving track, of a cell corresponding to each beam in the NG-RAN, on the ground;

within the specified time range, determine the current position of the terminal and predict a moving track of the terminal according to the terminal position information or the terminal position information and the terminal moving information; and determine, according to the moving track, of the cell corresponding to each beam in the NG-RAN, on the ground and the moving track of the terminal, the time range in which the terminal reaches the area co-covered by the current cell and the target cell.

9. The NG-RAN according to claim 5, wherein in the condition that the configuration message is sent to the terminal and is used for the terminal to carry out the terminal position information measurement, the processor is further configured to:

determine, according to the terminal position information in the measurement report, whether the terminal enters into a ground mobile communication network, if so, acquire information of a fourth cell closest to the terminal position information, and determine the fourth cell as the target cell, wherein the fourth cell is a cell of the ground mobile network;

send, to the terminal, configuration information for the terminal to carry out signal measurement on the fourth cell, such that the terminal measures signal strength of the fourth cell based on the configuration information;

receive the measurement report that is returned by the terminal and about the signal strength of the fourth cell; and send the cell handover message to the terminal, if the signal strength of the fourth cell in the measurement report reaches a preset value.

10. A mobility management method, applied to a terminal, wherein the mobility management method comprises:

reporting a measurement report to a current cell of a non-ground mobile communication network according to a configuration message, in the condition that the terminal is communicated with the non-ground mobile communication network, wherein the configuration message is sent to the terminal and is used for the terminal to carry out the terminal position information measurement, and the configuration message comprises the terminal position information, or terminal moving information and the terminal position information, and a reporting occasion of the configuration message;

the terminal moving information comprises moving speed, a moving direction and a type of the terminal, and the reporting occasion is a moment in the condition that a moving state of the terminal is rapidly changed or a reporting period; and the measurement report at least comprises signal strength of a target cell or terminal position information, and the current cell is a serving cell that provides services to the terminal at present in an NG-RAN (Next Generation-Radio Access Network) of the non-ground mobile communication network; and carrying out handover from the current cell of the non-ground mobile communication network to the target cell of the ground mobile network, according to a handover message, after the handover message of the current cell is received;

wherein the handover message is sent by the NG-RAN when a specified moment within a time range in which the terminal reaches an area co-covered by the current cell and the target cell is reached, and the time range is predicted by the NG-RAN according to the terminal position information in the measurement report and a moving speed and positioning information of the NG-RAN, or according to the terminal position information and the terminal moving information as well as the moving speed and positioning information of the NG-RAN, wherein the predicting comprises:

within a specified time range, predicting, according to the moving speed and positioning information of the NG-RAN, a moving track, of a cell corresponding to each beam in the NG-RAN of the non-ground mobile communication network, on the ground;

within the specified time range, predicting a moving track of the terminal according to the terminal position information or the terminal position information and the terminal moving information; and determining, according to the moving track of the cell corresponding to each beam in the NG-RAN of the non-ground mobile communication network, on the ground, and the moving track of the terminal, the time range in which the terminal reaches the area co-covered by the current cell and the target cell.

11. The method according to claim 10, wherein the reporting the measurement report to the current cell of the non-ground mobile communication network according to the configuration message comprises:

reporting, to the current cell, the measurement report carrying signal strengths of the specified cells when the signal strength of any one cell in the specified cells reaches a set threshold, if the signal strengths of specified cells are required to be returned in the configuration message.

12. The method according to claim 10, wherein the reporting the measurement report to the current cell of the non-ground mobile communication network according to the configuration message comprises:

reporting the measurement report carrying the terminal position information to the current cell regularly or in the condition that a preset condition is satisfied, if the terminal position information is required to be returned in the configuration message.

13. A terminal, wherein the terminal comprises a processor, a memory and a transceiver, wherein the processor is configured to read a program in the memory to perform the method according to claim 10.

14. The terminal according to claim 13, wherein the processor is specifically configured to:

report, to the current cell, the measurement report carrying the signal strengths of the specified cells when the signal strength of any one cell in the specified cells reaches a set threshold, if the signal strengths of specified cells are required to be returned in the configuration message.

15. The terminal according to claim 13, wherein the processor is further configured to:
report the measurement report carrying the terminal position information to the current cell regularly or in the condition that a preset condition is satisfied, if the terminal position information is required to be returned in the configuration message.

* * * * *